United States Patent [19]

Morris et al.

[11] Patent Number: 5,320,136
[45] Date of Patent: Jun. 14, 1994

[54] MAGNETICALLY OPERATED CHECK VALVE

[75] Inventors: Brian G. Morris, Houston; Richard J. Bozeman, Jr., Dickinson, both of Tex.

[73] Assignee: The United States of America as represented by the Administrator of the National Aeronautics and Space Administration, Washington, D.C.

[21] Appl. No.: 38,748

[22] Filed: Mar. 19, 1993

[51] Int. Cl.$^5$ .............................................. F16K 15/02
[52] U.S. Cl. ..................... 137/528; 137/516.29; 251/65
[58] Field of Search ................... 137/528, 529, 516.29; 251/65

[56] References Cited

U.S. PATENT DOCUMENTS

| | | | |
|---|---|---|---|
| 2,569,316 | 9/1951 | Jerman | 137/139 |
| 2,608,376 | 8/1952 | Adams | 137/516.29 |
| 2,609,835 | 9/1952 | Horvay | 137/528 |
| 2,646,071 | 7/1953 | Wagner | 137/528 |
| 2,667,895 | 2/1954 | Pool et al. | 137/528 |
| 2,949,931 | 8/1960 | Ruppright | 137/528 |
| 3,026,903 | 3/1962 | Roach | 137/533.13 |
| 3,076,417 | 2/1963 | Rhodes | 137/528 X |
| 3,217,736 | 11/1965 | Voss | 137/528 X |
| 3,495,620 | 2/1970 | Raimondi et al. | 137/529 |
| 3,770,008 | 11/1973 | Turney | 137/516.29 X |
| 4,275,759 | 6/1981 | Huang | 137/528 |
| 4,792,113 | 12/1988 | Eidsmore | 251/65 |
| 4,874,012 | 10/1989 | Velie | 137/557 |

*Primary Examiner*—Robert G. Nilson
*Attorney, Agent, or Firm*—Hardie R. Barr; Guy M. Miller; Edward K. Fein

[57] ABSTRACT

A magnetically operated check valve is disclosed having, in one aspect, a valve body and a movable poppet disposed therein, a magnet attracting the poppet to hold the valve shut until the force of fluid flow through the valve overcomes the magnetic attraction and moves the poppet to an unseated, open position; the poppet and magnet configured and disposed to trap magnetically attracted particulate and prevent it from flowing to a valve seating region.

7 Claims, 7 Drawing Sheets

MAGNETICALLY OPERATED CHECK VALVE

ORIGIN OF THE INVENTION

The invention described herein was made by employees of the U.S. Government and may be manufactured and used by or for the Government of the United States of America for governmental purposes without the payment of any royalties thereon or therefor.

BACKGROUND OF THE INVENTION

1. Field Of The Invention

This invention relates to check valves and to magnetically operated check valves and, in one aspect, to such a valve which is stable and durable in severe and extreme environments.

2. Description of Related Art

Check valves can be found in numerous industrial, aerospace and military applications where dependable operation, under demanding conditions, is critical. Such valves have an internal port or seat through which the fluid flows and a poppet, ball, reed, or gate that covers the seat to block flow in the reverse direction (see, e. g. the valve shown in FIG. 1). Fluid flow in the desired (forward) direction pushes the poppet open when the pressure differential across the valve is sufficient to overcome the force(s) restraining the poppet. Check valves utilize a spring, gravity, or magnetic force to return the poppet to the seated (blocking) position when there is no differential pressure. If the fluid flow attempts to reverse direction, the poppet is returned to the closed position, thus checking flow. All valves require a certain amount of seating stress to effect a seal when differential pressure in the reverse direction is low. The harder (more firm) that the seal material is the greater the load has to be to provide this stress. Reed poppets do not require a separate spring as the reed itself is a spring, and returns to the seated position when forward flow forces are no longer present. However, reed poppets are not found in fluid system check valve applications due to other performance limitations.

In a spring operated check valve, the valve's poppet and spring (see FIG. 1) form a classic spring-mass system that is subject to harmonic oscillation caused by flowing fluid. Harmonic motion (oscillations of the poppet) sustained for long periods of time can result in accelerated wear. Oscillations at frequencies even higher than the natural frequency are common in gaseous fluid service. A valve that ordinarily would be expected to operate for years can be ruined in a matter of hours when operating at conditions supporting this motion. Accelerated wear of the poppet and guide results in accelerated particulate generation. Companion components in the fluid system may be rendered inoperative by the abnormally high level of particulates generated by the check valve. Excessive particulates will contaminate fluids and increase the risk of decomposition or other adverse chemical reaction.

In certain prior art valves, self sustaining motion disturbs the fluid media flowing through the valve, setting the stage for undesirable secondary effects on other components or processes in the fluid system. In other prior art, gravity operated check valves must be positioned in a manner that permits gravitational forces to return the poppet to the seated position. This limitation eliminates many applications, especially aircraft and space flight. In certain spring-operated prior those in art valves, the load that provides the necessary seating stress with the valve seated/closed is imparted with the spring in the most extended position. Thus, as the valve strokes, this bias load is additive to the normal increase in spring load that occurs as the spring is compressed to provide a flow path and increases the differential pressure across the valve.

U.S. Pat. No. 3,026,903 to Roach discloses a magnetic check valve which includes a magnetically actuated return means for the valve element, a valve cage, a permanent magnet and a magnetically permeable closure member. The check valve incorporates a ball-type closure or poppet riding in a cage lined with longitudinal magnetic rods which urge the ball toward (in the same direction as reverse flow would occur) a valve seat to prevent reverse flow. The valve has a hard metal seat and a hard ball-type poppet that seal by direct contact with one another.

U.S. Pat. No. 3,495,620 to Raimondi et al. shows a magnetic valve which includes a movable valve member of magnetic material positioned between two magnetic inlet/outlet orifices. The valve incorporates dual magnets, one movable element and two fixed, one on either side of the movable element or poppet. Once a predetermined pressure has been established, the poppet is dislodged from the seated position and normal flow entering the valve passes through a port (that comprises the valve seat) in the first magnet and through matching holes in the poppet and final fixed magnet to the valve outlet. The magnet seats and the poppet seal by directly contacting one another. The magnet that comprises the seat is subject to deposition of magnetically attracted particles carried in the flow stream. The particles can lodge between the magnetic seat element and the magnetic movable element thus preventing closure of the valve.

U.S. Pat. No. 4,874,012 to Velie teaches a magnetically operated flow device which includes a movable member between magnets that define the flow passage. The valve has a magnet upstream of the seat area which may attract some but not all magnetic particles to itself before they reach the critical area of the seat/poppet interface where sealing takes place.

U.S. Pat. No. 2,539,316 to Jerman discloses a safety valve which includes a steel ball check valve positioned adjacent a magnet. The valve acts to close in case of excess flow in a line in which the valve is installed. A magnet holds a ball away from a seat through which flow must pass. Flow in excess of the normal range of flow dislodges the ball and carries it to the seat where it blocks flow. Thus it acts like a flow fuse rather than a check valve.

U.S. Pat. No. 2,646,071 to Wagner shows a magnetic check valve which includes a movable member having a magnet therein adjacent another magnet. The valve has a plastic seat and disc (poppet) sealing by direct contact with one another. The valve is configured to catch all particles as they enter the valve.

U.S. Pat. No. 2,667,895 to Pool et al. discloses a magnetically biased check valve which includes movable and stationary magnets. The magnetically actuated check valve incorporates dual magnets working in opposition to provide a separating force that moves one of the magnets toward the seat and sealing ring; the other magnet is anchored in the valve body. Flow in the direction that assists in separating the magnets (reverse to normal flow) also assists in placing the magnet against the seat and seal, thus checking flow. The seat o-ring is embedded in the valve body. The conventional way to embed or attach an o-ring to a surface is to use a dovetail groove into which an o-ring is forced. With this type of installation there is no room for the o-ring to grow in case of thermal expansion or in case of o-ring swell (due to exposure to certain fluids). When the o-ring is not allowed to grow uniformly, it will be distorted or damaged and will no longer be effective. The seating magnet is subject to deposition of magnetically attracted particles carried in the flow stream. The particles can lodge between the magnet and valve seat thus preventing closure of the valve. The seating forces in the valve are low, and therefore sealing forces are also low at low reverse differential pressures. The valve is not configured to provide maximum magnet seating forces at the seated position to reduce leakage at low reverse differential pressures. Since the seating forces in the valve increase with displacement of the magnet (poppet) from the seat, the valve can chatter as does a spring actuated valve. The valve will augment flow-induced harmonic motion since it stores and returns energy to the moving mass of the poppet as does the spring-mass system of the conventional spring loaded poppet.

U.S. Pat. No. 2,949,931 to Ruppright shows a magnetic check valve having a magnetic cage with the moving valve member contained therein. The valve has a magnet comprising the inlet flow path and seat of the valve, and a loosely guided disc that acts as the poppet to preclude reverse flow. The magnet that comprises the seat in this configuration is subject to deposition of magnetically attracted particles carried in the flow stream. The particles can lodge between the magnet and the valve disc (poppet) thus preventing closure of the valve. A magnetic seat and the disc seal by directly contacting each other.

There has long been a need for a magnetically operated check valve which does not augment flow-induced harmonic oscillation and in which poppet wear is reduced. There has long been a need for such a valve in which energy consumption is reduced and particulate generation is minimized. There has long been a need for such a valve in which required seating stresses are effectively achieved without adding to the differential pressure of the valve at full flow conditions.

SUMMARY OF THE INVENTION

In one embodiment of a valve according to this invention, a valve has a valve body with an inlet end or fitting, preferably a removable inlet fitting and an outlet end or fitting, preferably a removable outlet fitting. One or more magnets is removably held in a magnet holder which is removably disposed at the center of the inlet fitting, with flow channels which permit incoming fluid to flow into the inlet fitting and around the magnet. A poppet is movably disposed in a poppet chamber in the valve body so that the poppet is movable to contact a shoulder around the inlet fitting thus sealing off the flow channels around the magnet and closing the valve. The poppet or at least a portion thereof is made from magnetic material and the magnet holds the poppet against the inlet fitting's shoulder until the force of fluid flow through the valve overcomes the magnetic force holding the poppet to the magnet. Projections from the outlet fitting serve as stops to limit poppet movement away from the inlet fitting shoulder. Fluid flows between these projections and out from the outlet fitting. A sealing o-ring is provided between the inlet fitting and the valve body and between the outlet fitting and the valve body. A sealing o-ring is also provided between an edge of the poppet and the shoulder of the inlet fitting. The inlet fitting and poppet are designed and this o-ring is disposed so that a limited o-ring movement envelope is provided and so that an inclined edge of the centers the o-ring and guides it into position to contact both a sealing surface on the inlet fitting and a sealing surface on the poppet. The poppet chamber and the poppet are designed for a relatively close fit so that the poppet is prevented from binding against the cavity walls.

A magnetically operated check valve in another embodiment of the present invention has a valve body with a fluid flow channel therethrough and a cavity therein in communication with the fluid flow channel in which a valve poppet is movably disposed. The poppet has a magnetic portion which is attracted to and held by magnetic force against a body magnet secured in the valve body to close the valve. Once the force of fluid flow through the valve exceeds the force of magnetic attraction between the magnetic poppet and the body magnet the poppet is moved and the valve is opened permitting flow through the valve body. In one embodiment the poppet is configured and the magnets are positioned so that any magnetically-attracted particles flowing in the valve body are trapped in a magnetic field situated apart from a valve seating region. Also providing a tortuous flow path contributes to the trapping of particles before they reach the seating region.

Valves according to this invention do not require springs, but incorporate one or more permanent magnets to perform the functions of holding the valve closed until a certain flow level is reached and then returning the poppet to the seated position when flow again falls below that level. The basic material of the poppet can be either magnetic or nonmagnetic. A magnet is incorporated either into the body of the valve or into both the valve and the poppet. If only one component incorporates a magnet, the other incorporates a magnetic material to work in conjunction with the magnet. The poppet is magnetically attracted to the seat (inlet side of the valve body) to return the poppet to the seat in the absence of forward fluid flow, and unattracted to the outlet side of the valve.

In certain preferred embodiments, new generation ceramic, alnico, and rare earth elements provide a selection of magnets for use in valves according to this invention. Encapsulation of the magnet with a desired material (e. g. a material which will not be adversely affected by the fluid which will flow through the valve and/or which is chemically compatible with fluid to be passed through the valve) can be accomplished in cases where exposure of the magnet to the fluid media is not desirable.

Due to magnetic field limitations the stroke of a magnetically operated valve may be shorter than that of an equivalent flow capacity spring-operated valve, thus the seat diameter is increased to obtain the same flow area/capacity. Increasing the seat diameter increases the pressurized area of the poppet when in the seated position, This in turn beneficially reduces the pressure differential required to open the valve (cracking pressure) and increases the available seating force with low reverse pressure differential, thus aiding the flow-checking action of the valve. Under full rated flow conditions, the poppet will be farthest from the seat and the magnetic attraction will be the least. This is opposite to that of a spring operated check valve in which the spring is compressed to its maximum in the fully opened position. The magnetically operated valve thus offers less flow resistance at rated flow. The valve is designed to assure a small but significant differential pressure across the poppet, pinning it against the outlet portion of the housing, reducing or eliminating poppet instability. With magnets at the center of the inlet fitting and poppet, the magnetic field will assist in centering and guiding the poppet, thus reducing wear that would normally be expected at the interface of the poppet and the valve body during poppet stroking. The load that provides the necessary seating stress with the valve seated/closed is imparted by the magnetic field at the lowest magnetic gap, which is the strongest load imparted by the magnet(s). As the poppet strokes, this load is reduced as the poppet moves away from the seat to provide a flow path, thus minimizing differential pressure across the valve.

In order to obtain satisfactory sealing at very low reverse differential pressures with the lower seating forces obtainable in a reasonably compact design (which precludes large magnets) in certain preferred embodiments of check valves according to this invention, a magnetic check valve has naturally uniform, continuous contact between the o-ring and its mating surfaces. The o-ring is undistorted in order to provide such contact, otherwise perfect sealing will be not be achieved.

In the seat/poppet/o-ring sealing configuration of certain preferred embodiments, the poppet's axis when seated can float within the tolerances of the fit between the poppet and the seat ring. Such variation is tolerated because a primary sealing surface on the check valve body inlet fitting is at a right angle to a longitudinal axis of the check valve, thus displacement of the poppet axis away from the main check valve axis does not change the separation between the parts on any given circle concentric to the poppet axis. This allows the o-ring to naturally and uniformly contact both sealing surfaces without distortion. If the poppet tips on its axis, the magnet is strong enough to bring it into full contact with the o-ring and effect the seal. The poppet's leading edge (See FIG. 3) is a conical surface and is angled toward the sealing location so that as it approaches the seat the o-ring is moved into a mutually desirable sealing position following full excursion of the poppet from the full open position. Thus, the poppet contacts the o-ring before it is seated in metal-to-metal contact against another part of the valve. Metal-to-metal seating takes place under high differential pressures to assure there are no gaps into which the o-ring might be extruded. The o-ring is free to float within the confines of the seat/seat ring/poppet region until picked up by the poppet and carried to a seated position.

In preferred embodiment a magnetically operated check valve is provided which has a removable magnet holder.

Since there is no space required for spring installation, valves according to this invention may be relatively short (axial length) which is advantageous in certain applications where axial space is limited, and they may require a very low fluid volume which is advantageous for use in e.g., gas compressors. The unrestrained seat sealing o-ring and the extrusion preventing metal-to-metal final seating are designed to provide reliable sealing from zero pressure to thousands of pounds per square inch. The valve design minimizes the use of sliding fits and the related friction, wear, particle generation, and binding.

With the operating magnet incorporated in the entrance portion of the valve body, directly in the flow path, magnetic particulate carried by the fluid is trapped by the magnetic field before entering the seat area. The valve may thus double as a particulate filter in systems such as aircraft hydraulic systems where particulate control is very important.

It is, therefore, an object of at least certain preferred embodiments of the present invention to provide:

New useful, unique, efficient, and effective magnetically operated check valves;

Such valves with one or more permanent magnets to operate a check valve and to provide static sealing stress when there is inadequate fluid differential pressure to effect a perfect seal;

Such valves wherein no harmonic instability occurs during operation;

Such valves wherein the differential pressure across the valve that results from the seating mechanism of the valve is reduced as flow is increased, thus providing more flow capacity;

Such valves wherein particles of magnetic material are trapped in a magnetic field prior to reaching the sealing region of the valve;

Such valves in which a magnetic field assists in centering and guiding the poppet so that wear of the poppet and the valve body is reduced;

Such valves which offer less flow resistance at rated flow so that the differential pressure across the valve is reduced, saving energy in comparison to valves with higher pressure drop;

Such valves in which the level of particulate generated inherently by operation of the check valve is reduced, to a very low level, thus decreasing the effect on companion components in the fluid system as well as the risk of decomposition of liquid fuels and oxidizers, or other adverse chemical reaction; and Such valves in which seating stresses of the magnetic operation valve are achieved without adding to the differential pressure of the valve at full flow conditions.

The present invention recognizes and addresses the previously mentioned problems and long-felt needs and provides a solution to those problems and a satisfactory meetings of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

BRIEF OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective equivalent embodiments.

DESCRIPTION OF PREFERRED EMBODIMENT

Figure 1:
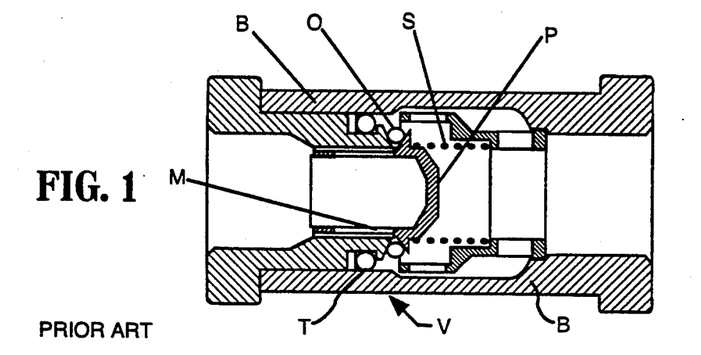
FIG. 1 is a side view in cross-section of a prior art valve.

FIG. 1 illustrates a typical prior art spring-operated check valve V which has a valve body B, a poppet P, a spring S, an o-ring 0, an o-ring T, and a metal-to-metal seat M.

Figure 2:
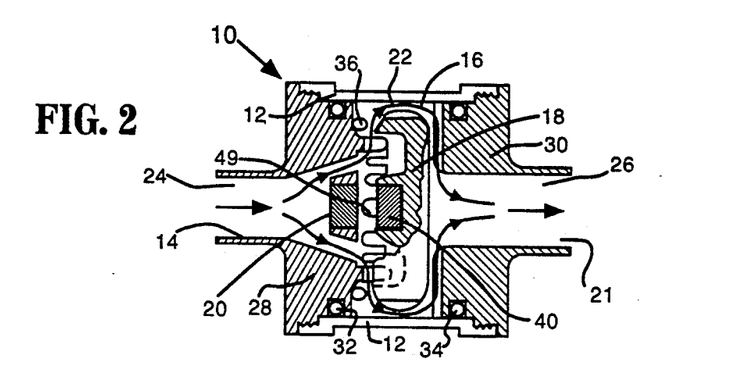
FIG. 2 is a side view in cross-section of a valve according to this invention.
Figure 3:
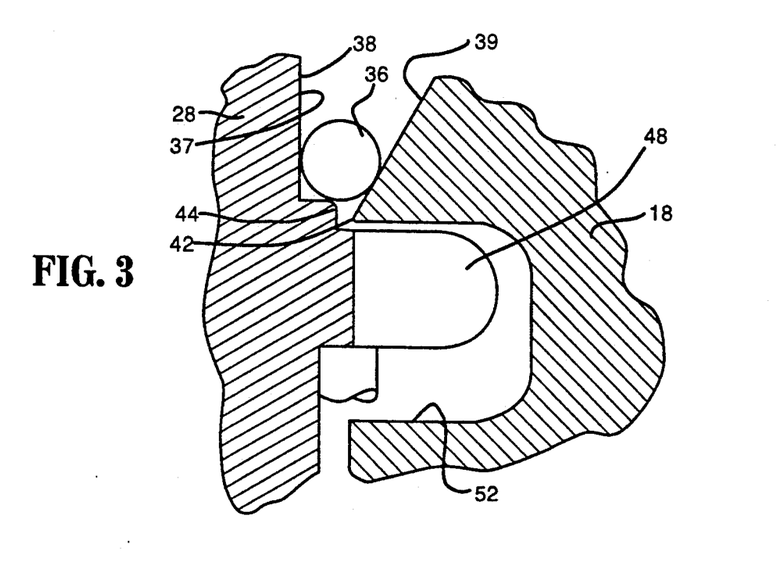
FIG. 3 is an enlarged view of an inlet fitting, o-ring, and poppet of the valve of FIG. 2.

Referring now to FIGS. 2 and 3, a magnetically operated check valve 10 according to one preferred embodiment of the present invention has a valve body 12, a magnet 20 secured to an inlet fitting 28 threadedly and removably mounted in the body 12. Fluid flows into the valve body through an inlet 14 in the inlet fitting 28. A poppet chamber 16 in the valve body in fluid communication with the inlet 14 contains a poppet 18 movably disposed therein, and an outlet 21 in an outlet fitting 30 in fluid communication with the chamber 16 and from it fluid exits the valve body 12. A magnet 40 in the poppet 18 is attracted to the magnet 20. Central location of the magnet 20 in the inlet fitting and of the magnet 40 in the poppet provides for magnetic guiding of the movement of the poppet and for correct centering of the poppet. If no magnet 40 is used, a magnetically attractive portion can -be provided in its place on the poppet. A flow channel 22 includes a channel 24 through the inlet 14, the interior of the chamber 16, and a channel 26 through the outlet fitting 30. Arrows indicate flow path and direction. Fluid flows through indentations 49 on the inlet fitting and then around the poppet. It is within the scope of this invention to enlarge the clearance between the body 12 and the poppet 18.

A sealing o-ring 32 is disposed between the inlet fitting 28 and the valve body 12. A sealing o-ring 34 is disposed between the outlet fitting 30 and the valve body 12. A sealing o-ring 36 is disposed in the poppet chamber 16 between a shoulder 38 of the inlet fitting 28 and an edge 39 of the poppet 18. A protrusion 48 of the inlet fitting 28 is received within a recess 52 of the poppet 18 and serves to internally guide the poppet 18 in its movement.

As shown in enlarged detail in FIG. 3, the shoulder 38 and the poppet edge 39 present sealing surfaces to the o-ring 36. The edge 39 is inclined with respect to an edge 37 of the shoulder 38 so that as the poppet returns from a position apart from the shoulder 38, i. e., apart from the magnet 20, the edge 39 moves the o-ring 36 into position centering it on the poppet to seal against the edge 37 and against the edge 39 with little or no distortion of the o-ring 36. As the poppet is moving to close the flow, leading tip 42 of the poppet 18 does not make metal-to-metal contact with a sub-shoulder 44 of the shoulder 38 until the edge 39 has moved the o-ring into an effective sealing position.

FIGS. 4A-7 illustrate alternative parts for a valve according to this invention.

Figure 4A:
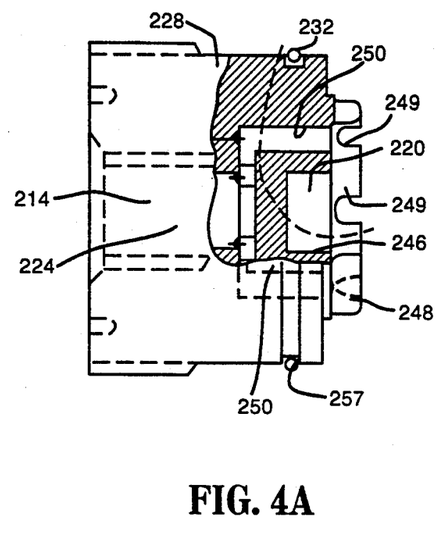
FIG. 4A is a side view in cross-section of an inlet fitting of a valve according to the present invention.
Figure 4B:
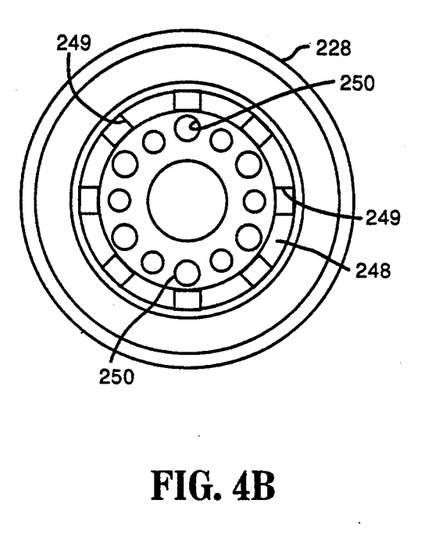
FIG. 4B is an end view of the fitting of FIG. 4A.

FIGS. 4A and 4B show an inlet fitting 228 with an inlet 214 and a magnet 220 disposed in a magnet holder 246. A protrusion 248 protruding from the inlet fitting assists in positioning and centering the poppet 218 as discussed below. Flow is permitted past the protrusion 248 via indented portions 249. A recess 257 holds an 0-ring 232.

Fluid flows into the inlet fitting 228 through inlet 214 and its inlet channel 224 and then into poppet flow channels 250 from which the fluid exits the inlet fitting and passes the protrusion 248.

Figure 5A:
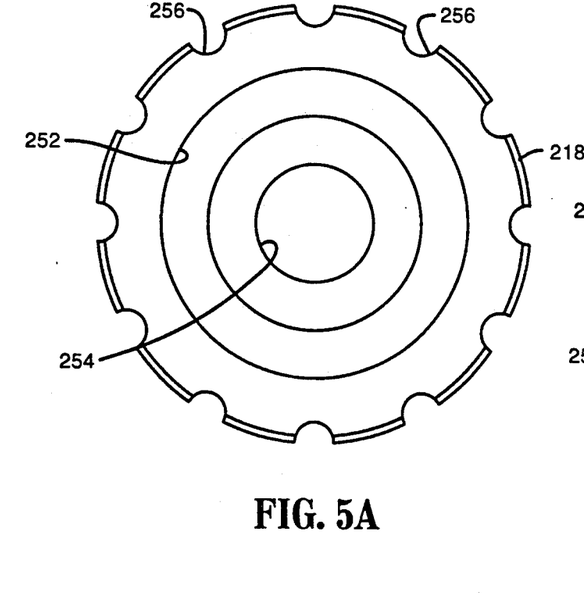
FIG. 5A is an end view of a poppet for the valve of FIG. 4A.
Figure 5B:
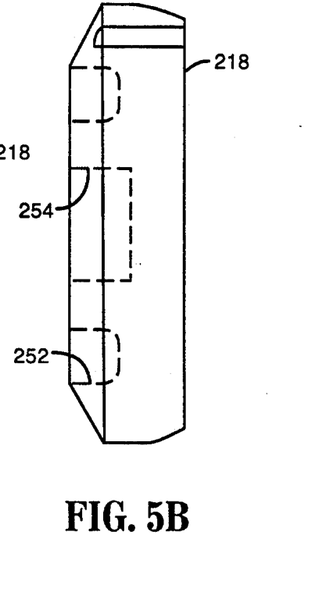
FIG. 5B is a side view of the poppet of FIG. 5A.

FIGS. 5A and 5B show the poppet 218. The poppet 218 has an annular recess 252 around it which receives the protrusion 248 of the inlet fitting 228 when the poppet approaches a shoulder such as 38, FIG. 2. This assists in correctly positioning the poppet for encountering an o-ring such as 36, FIG. 2 and for centering the poppet 218. A recess 254 holds a magnet such as 40, FIG. 2. Fluid is permitted to flow in recesses 256 in the poppet 218. Clearance between the body and poppet can be enlarged by reducing the overall diameter of the poppet so as to eliminate the recesses 256.

Figures 6A, 6B:
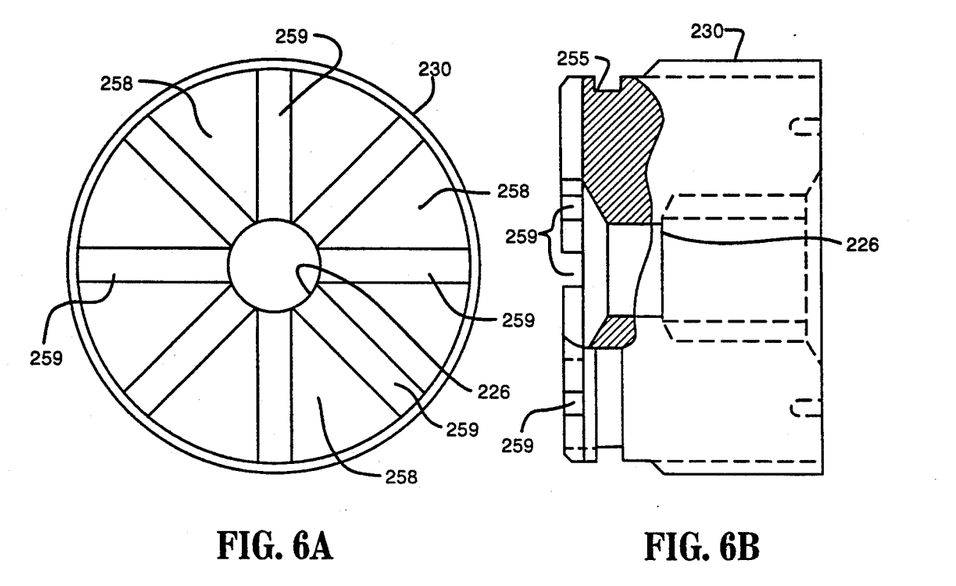
FIG. 6A is an end view of an outlet fitting for the valve of FIG. 4A.
FIG. 6B is a side view of the outlet fitting of FIG. 6A.

FIGS. 6A and 6B show an outlet fitting 250 and an outlet channel 226. Protruding ribs 258 serve as a stop for the poppet 218 liiting its movement in a cavity in a cavity such as 16 in FIG. 2 Receiver 259 between the ribs 258 provide a flow path for fluids to enter the channel 226. A recess 255 holds an o-ring similar to 34, FIG. 2.

Figure 7:
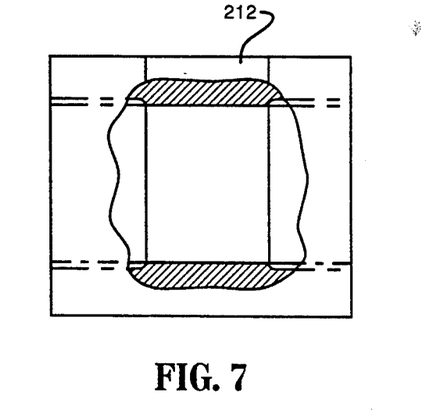
FIG. 7 is a side view, partially cut away, of a housing for the valve of FIG. 4A.

FIG. 7 illustrates a valve body 212.

A valve with the parts shown in FIGS. 4A - 7 is not as compact as the valve shown in FIG. 2. The valve of FIG. 2 has a relatively light- weight body shape and relatively stubby inlet and outlet connections, resulting in a more compact design.

A valve 100 according to this invention is shown in FIGS. 8A-10. Portions and parts of the valve 100 are shown in FIGS. 11-17. The valve 100 has a valve body 102, an inlet fitting 104, a magnet holder 106, a magnet 108, a movable poppet 110, and an outlet fitting 112. A sealing o-ring 60 is disposed between the inlet fitting 104 and the valve body 102 and a sealing o-ring 61 is disposed between the outlet fitting 112 and the valve body 102. The poppet 110 moves in a cavity 114 in the valve body 102. A sealing o-ring 63 is permitted limited movement in the cavity 114.

Figures 8A, 8B:
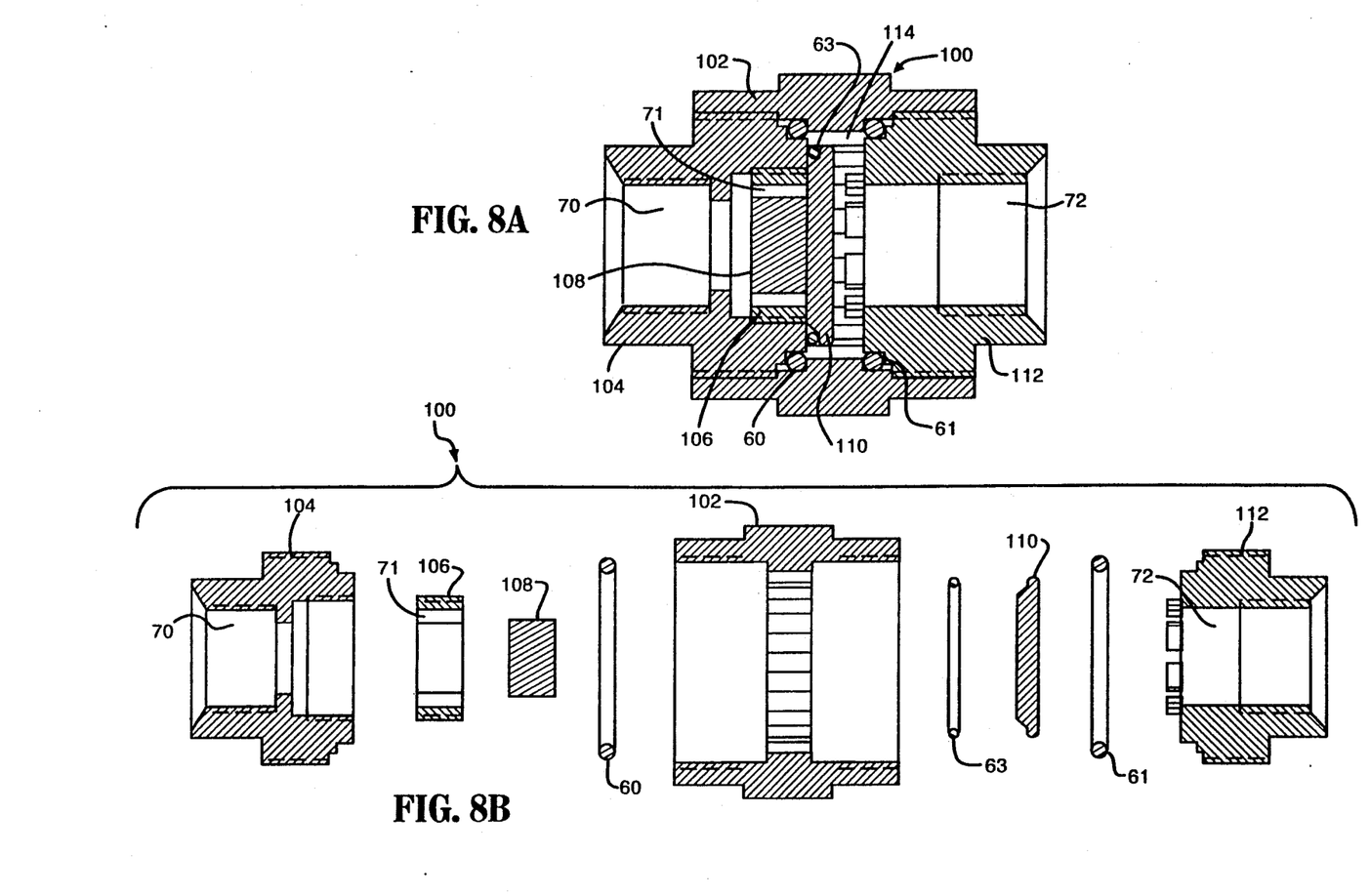
FIG. 8A is a side view in cross-section of a valve according to this invention.
FIG. 8B shows an exploded view of the valve of FIG. 8A.

Fluid flows through the valve 100 as follows: fluid enters through an inlet channel 70 in the inlet fitting 104 and flows in flow channels 71 in the magnet holder 106 into the cavity 114 and then into a flow channel 72 in the outlet fitting 112 from which it exits the valve 100.

The inlet and outlet fittings are secured in place in the body 102 by welding, by a press fit, by threaded engagement, or by other suitable means.

Figure 9:
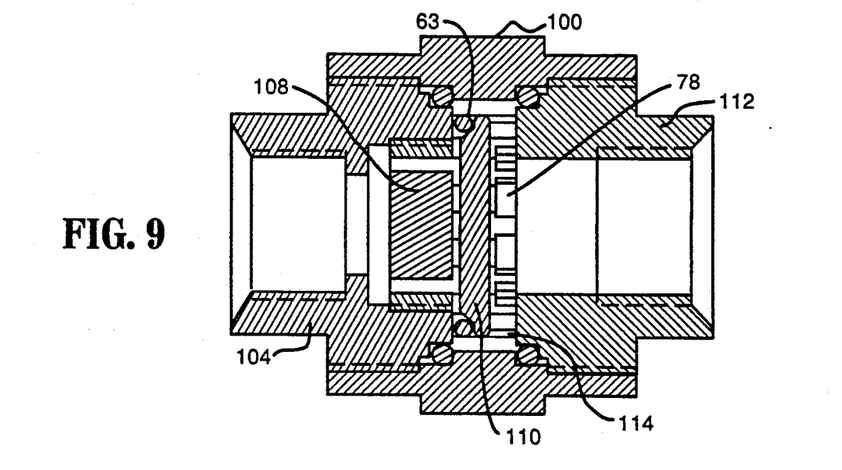
FIGS. 9 and 10 show various stages of operation of the valve of FIG. 8A.
Figure 10:
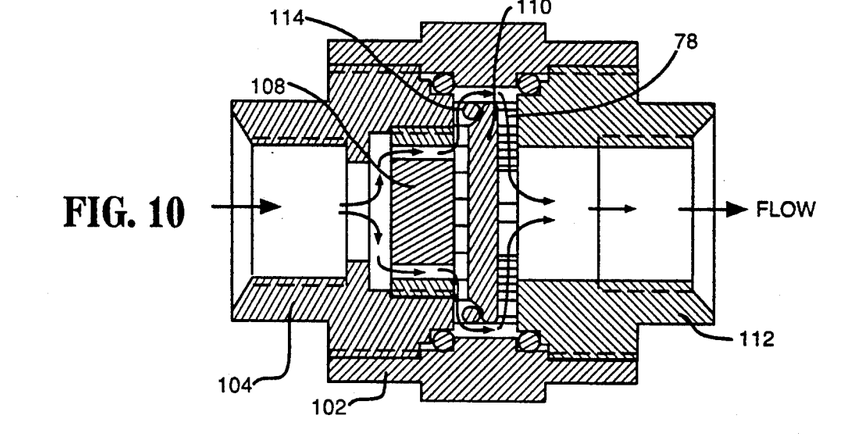
Figure 11:
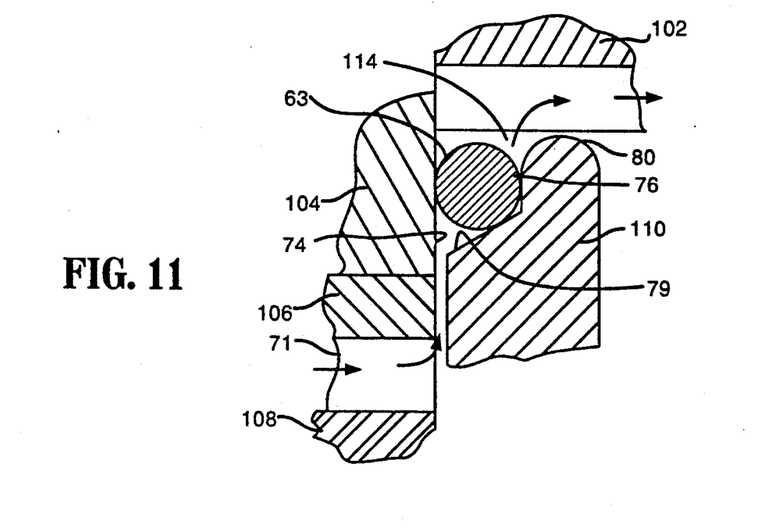
FIG. 11 is a side cross-sectional view, enlarged, of a portion of the valve of FIG. 8A.

FIGS. 9 and 10 show the poppet 110 in different positions. In FIG. 9 the poppet 110 is not in contact with a shoulder 74 of the inlet fitting 104, (see enlarged detail FIG. 11) but the force of the magnet 10B acts on the magnetically attractable material of the poppet 110 with sufficient force to hold the o-ring 63 against the shoulder 74 and against a surface 76 of the poppet 110 to close the valve 100. It is preferred that the surfaces 74 and 76 be parallel or substantially parallel to effect a good seal with the o-ring 63. (See FIG. 11) The cavity 114 is sized and a protrusion 78 of the outlet fitting 112 is size, shaped, and disposed so that binding of the poppet 110 in the cavity 114 is inhibited or prevented. By curving an end 80 of the poppet, binding of the poppet is also inhibited. An angled (conical) surface 79 of the poppet 110 is disposed and configured to move ("lift") the o-ring 63 upon initial contact therewith as the poppet 110 moves toward the magnet 108, moving the o-ring and centering it so that it contacts the sealing surface of the shoulder 74 and the surface 76 of the poppet 110 prior to contact of the poppet and inlet fitting.

FIG. 10 illustrates the valve 100 in full open position with the poppet 110 abutting the protrusion 78 of the outlet fitting 112. Of course, the poppet itself could have such protrusions or a stop member.

Figure 12:
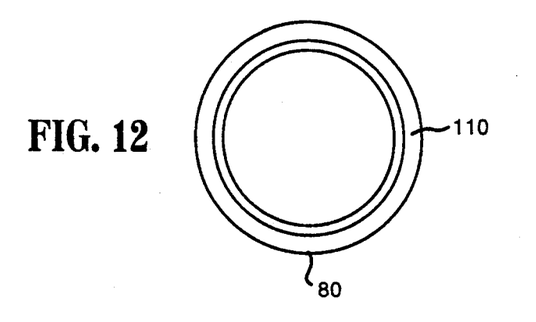
FIG. 12 is an end view of a poppet of the valve of FIG. 8A.

FIG. 12 illustrates an end view of the poppet 110 as seen from the left in FIG. 8A.

Figure 13:
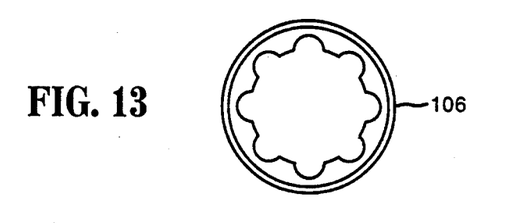
FIG. 13 is an end view of a magnet holder of the valve of FIG. 11.

FIG. 13 illustrates an end view of the magnet holder 106 with the flow channels 71 which are not blocked when the magnet 108 is cylindrically shaped and fits within the inner circumference of the magnet holder 106. It is within the scope of this invention to provide either a magnet holder without flow channels and have a flow channel or channels formed in the body of the inlet fitting or to have a flow channel or channel of a shape different from that shown in FIG. 13 and/or a magnet of a different shape from that shown in FIG. 8B. The magnet holder 106 is secured within the inlet fitting by any suitable means.

Figure 14:
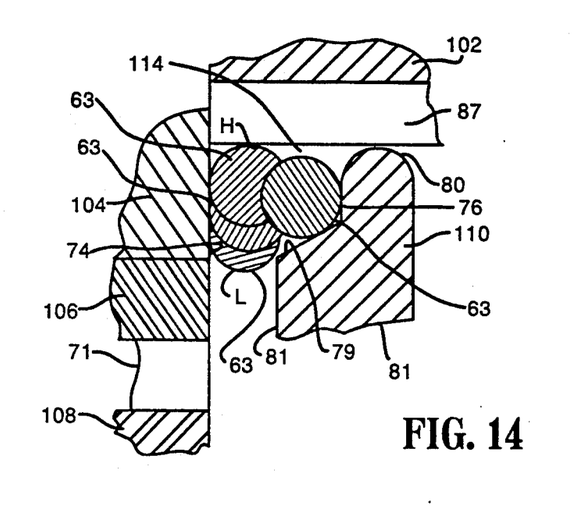
FIG. 14 is a side cross-sect-ion view of the inlet fitting, poppet, and o-ring of the valve of FIG. 8A showing various o-ring positions with the poppet open.

FIG. 14 illustrates that the inlet fitting 104, poppet 110, and housing 102 are designed so that the o-ring 63 has a limited movement envelope (four possible positions shown for the 0-ring) and the angled surface 79 of the poppet will contact and move the o-ring to a desired sealing disposition between the poppet and the inlet fitting. As shown in FIG. 14, the o-ring 63 has a "lowest" possible position L and "high" position H. As the poppet moves toward the inlet fitting, the angled surface 79 contacts and moves the o-ring so that a positive seal will be created between the inlet fitting and the poppet. In a most preferred embodiment this is achieved with the parallel or nearly parallel shoulder 74 and surface 76, as well as with the angle from vertical of the angled surface 79 (vertical as viewed as in FIG. 14) and the position of the angled surface with respect to the body of the poppet. The space 114 is designed and configured so that, with the poppet in place, collapse of the o-ring is limited, inhibited, or most preferably totally prevented. It is also most preferred that the o-ring be sized so that it cannot pass through the space between an end of the poppet 81 and the shoulder 74 when the valve is in a full open position (as shown in FIG. 14).

Figure 15:
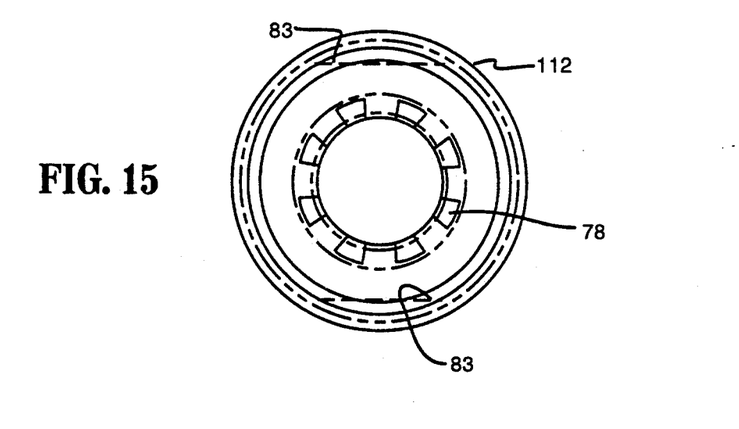
FIG. 15 is an end view of the outlet fitting of the valve of FIG. 8A.
Figure 16A:
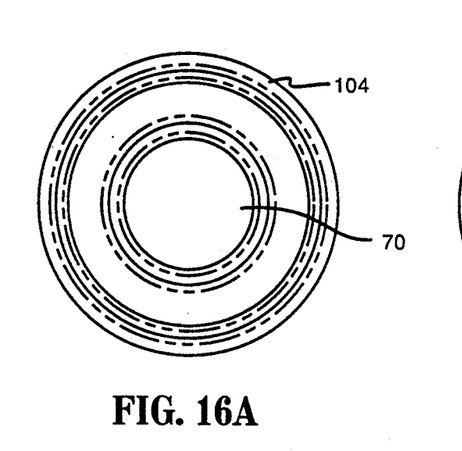
FIGS. 16A and 16B are end views of the inlet fitting of the valve of FIG. 8A.
Figure 16B:
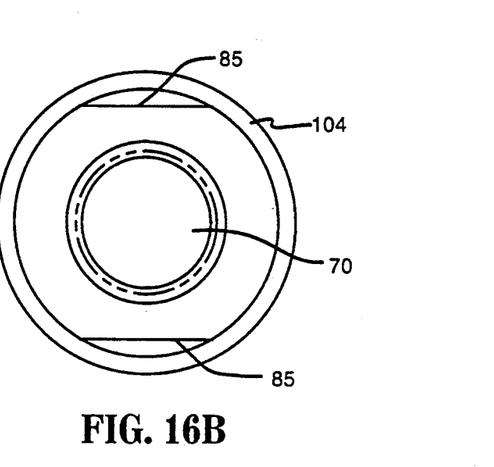

The outlet fitting 112 is shown in FIG. 15, as seen from the left in FIG. 8A. Wrench flats 83 are provided for valve assembly and disassembly. Opposite end views of the inlet fitting 104 are shown in FIGS. 16A and 16B with wrench flats 85 for valve assembly and disassembly.

Figure 17:
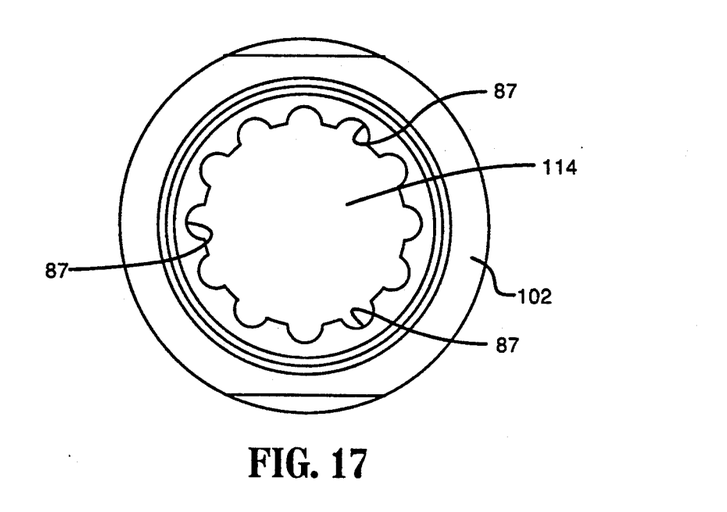
FIG. 17 is an end view of the valve body or housing of the valve of FIG. 8A.

FIG. 17 shows an end view of the valve body 102 with its cavity 114 and flow channels 87 at the edge of the cavity 114. As the poppet 110 moves away from the inlet fitting 104 and the o-ring 63 moves out of contact with the shoulder 74 or the surface 76, flow is permitted around the poppet in the flow channels 87 to the outlet fitting 112.

The valve of FIG. 2 with its internally guided poppet has a relatively larger stroke than a valve ( e. g. as shown in FIG. 8A) which has an externally guided poppet; but a lighter weight valve is possible when an externally guided poppet is used. Also, it is possible, by using an externally guided poppet, to achieve more effective magnetic pull for sealing stress application to 0-rings.

Both disposition of the magnet or magnets used with the valves described herein and the relatively tortuous path (e.g. fluid makes at least one, but preferably two or more turns, most preferably at least right angled turns, prior to passing a valve seating region) provided for fluid flow result in the trapping of particulates before they reach a valve seating region wherein they could impede closing off of the valve or otherwise adversely affect valve performance. The invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps.

What is claimed is:

1. A magnetically operated check valve comprising
   a valve body,
   an inlet fitting removably secured in the valve body,
   a poppet movably disposed in a poppet cavity in the valve body, the poppet having a magnetically attractive portion,
   an outlet fitting removably secured in the valve body,
   at least one magnet mounted in the inlet fitting and having magnetic attractive force for attracting the magnetically attractive portion of the poppet to hold the valve closed to fluid flow until force of fluid against the poppet exceeds the magnetic attractive force and moves the poppet to open fluid flow through the valve,
   the valve having a seating region wherein an o-ring seals against the poppet and seals against a sealing shoulder of the inlet fitting to close off flow through the valve, wherein the seating region is spaced apart from the magnet and wherein said magnetically attractive portion of said poppet is a magnet mounted to the poppet for magnetically attracting the poppet to the at least one magnet mounted in the inlet fitting.

2. The check valve of claim 1 wherein
the inlet fitting has a poppet guide portion receivable within a recess in the poppet for centering the poppet and for guiding movement of the poppet.

3. The check valve of claim 1 wherein
the inlet fitting has fluid flow indentations therein for facilitating fluid flow around the poppet.

4. A magnetically operated check valve comprising
a valve body,
an inlet fitting removably secured in the valve body,
a poppet movably disposed in a poppet cavity in the valve body, the poppet having a magnetically attractive portion,
an outlet fitting removably secured in the valve body,
at least one magnet mounted in the inlet fitting and having magnetic attractive force for attracting the magnetically attractive portion of the poppet to hold the valve closed to fluid flow until force of fluid against the poppet exceeds the magnetic attractive force and moves the poppet to open fluid flow through the valve,
the valve having a seating region wherein an o-ring seals against the poppet and seals against a sealing shoulder of the inlet fitting to close off flow through the valve, wherein the seating region is spaced apart from the magnet, the poppet is moveable to contact the sealing O-ring and close off fluid flow through the valve prior to contact between a leading edge of the poppet and a sealing shoulder on the inlet fitting, and wherein the poppet's leading edge has an inclined portion which contacts and moves the sealing O-ring into a position to effectively seal off fluid flow through the valve while inhibiting distortion of the sealing O-ring.

5. The check valve of claim 4 wherein
the inlet fitting, the valve body, and the poppet define a cavity in which the sealing O-ring is disposed and which provides a confining envelope which limits movement of the sealing O-ring.

6. The check valve of claim 5 wherein
movement of the poppet is limited by protrusions extending from the outlet fitting so that when maximum fluid flow occurs through the valve and the poppet is at a maximum distance away from the inlet fitting, the space between the inlet fitting and the leading edge of the poppet is such that the sealing o-ring cannot pass between the inlet fitting and the leading edge of the poppet.

7. The check valve of claim 4 wherein the poppet additionally seals directly against the inlet fitting.

* * * * *